United States Patent
Lincourt et al.

(10) Patent No.: US 11,323,509 B2
(45) Date of Patent: May 3, 2022

(54) UNION FORMATION OF EDGE CLOUD-NATIVE CLUSTERS

(71) Applicant: EMC IP Holding Company LLC, Hopkinton, MA (US)

(72) Inventors: Robert A Lincourt, Franklin, MA (US); Victor Fong, Medford, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/885,439

(22) Filed: May 28, 2020

(65) Prior Publication Data

US 2021/0377336 A1  Dec. 2, 2021

(51) Int. Cl.
| | |
|---|---|
| *H04L 29/08* | (2006.01) |
| *H04L 12/911* | (2013.01) |
| *H04L 67/1008* | (2022.01) |
| *H04L 47/78* | (2022.01) |
| *H04L 47/70* | (2022.01) |
| *H04L 47/74* | (2022.01) |

(52) U.S. Cl.
CPC ........ *H04L 67/1008* (2013.01); *H04L 47/743* (2013.01); *H04L 47/781* (2013.01); *H04L 47/788* (2013.01); *H04L 47/822* (2013.01); *H04L 47/828* (2013.01)

(58) Field of Classification Search
CPC . H04L 67/1008; H04L 47/743; H04L 47/788; H04L 47/822; H04L 47/781; H04L 47/828
See application file for complete search history.

(56) References Cited

U.S. PATENT DOCUMENTS

| | | | |
|---|---|---|---|
| 10,791,168 B1* | 9/2020 | Dilley | H04L 67/288 |
| 2011/0213879 A1* | 9/2011 | King | H04L 43/0882 709/224 |
| 2012/0131591 A1 | 5/2012 | Moorthi et al. | |
| 2012/0233668 A1* | 9/2012 | Leafe | G06F 9/00 726/4 |
| 2014/0059226 A1* | 2/2014 | Messerli | H04L 47/783 709/226 |
| 2014/0101013 A1 | 4/2014 | Baset et al. | |
| 2016/0012523 A1 | 1/2016 | Buswell | |
| 2017/0041206 A1 | 2/2017 | Maes et al. | |
| 2019/0044886 A1* | 2/2019 | Bernat | H04L 41/5019 |
| 2019/0141121 A1* | 5/2019 | Bernat | H04L 67/1008 |
| 2020/0021502 A1* | 1/2020 | Bernat | G06F 9/5094 |
| 2020/0076715 A1* | 3/2020 | Kondapalli | H04L 43/08 |
| 2020/0134207 A1* | 4/2020 | Doshi | G06F 9/5077 |
| 2020/0136921 A1* | 4/2020 | Doshi | H04L 67/141 |
| 2020/0151786 A1 | 5/2020 | Butters et al. | |
| 2021/0248087 A1 | 8/2021 | Pan et al. | |

OTHER PUBLICATIONS

Khan, Amin, Current trends and future directions in community edge clouds, Oct. 1, 2015, 2015 IEEE 4th International Conference on Cloud Networking (CloudNet), pp. 239-241 (Year: 2015).

\* cited by examiner

*Primary Examiner* — Yaotang Wang
(74) *Attorney, Agent, or Firm* — Workman Nydegger

(57) ABSTRACT

Cloud-native clusters are disclosed and configured to for an edge cloud. The edge cloud includes using private infrastructure to include edge stations that are configured to perform cloud-native applications. The edge stations are geographically closer to end users and end user devices.

20 Claims, 4 Drawing Sheets

UNION FORMATION OF EDGE CLOUD-NATIVE CLUSTERS

FIELD OF THE INVENTION

Embodiments of the present invention generally relate to cloud-based or cloud-native clusters. More particularly, at least some embodiments of the invention relate to systems, hardware, software, computer-readable media, and methods for edge cloud-native clusters that include or operate on privately owned infrastructure.

BACKGROUND

The services and functions provided by datacenters is often referred to as cloud-based services. The datacenter includes the hardware and software necessary to perform these services over networks such as the Internet. However, a datacenter is not necessarily close to the end user or end-user devices. Further, datacenters often suffer from various problems including network latency (related to the distance between the datacenter and the end device), bandwidth costs, and application availability.

Edge stations or edge computing is a potential solution to these problems. Edge stations, for example, are sort of like mini datacenters. Edge stations can run pieces of or smaller workloads, such as the delivery edge of a content delivery network. Users can connect with edge stations to obtain additional functionality that is the same as or similar to the functionality provided from conventional datacenters. The problem is that cloud service providers have difficulty in forming edge stations (or groups thereof) that can adequately cover various geographic areas. Providing sufficient edge stations to cover a large area (e.g., the United States and Canada) requires a huge amount of investment in different categories such as hardware, real estate, deployment, maintenance costs, etc.

More specifically, even deploying to a specific geographic area such as a city would be difficult. In addition to the substantial amount of hardware that would need to be acquired and deployed, there is also a need to secure real estate. Further, maintenance would be costly because maintenance crews would be required to travel from installation to installation.

In addition, software providers have difficulty in orchestrating software components to edge stations operating at the edge of the network. As a result, the user experience is often limited by the compute and storage capabilities of their end devices (IoT devices, mobile phones, tablets, etc.). The user experience may also be impacted by the network speed and bandwidth when there is a need for software to communicate with the cloud.

At the same time, many privately owned infrastructure or hardware is under-utilized. However, there is no standard way for private owners to share their under-utilized infrastructure. Even though the capacity of privately owned hardware exists, accessing this resource is difficult. There is no structure or standards that allow owners to open their infrastructure to cloud service providers.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
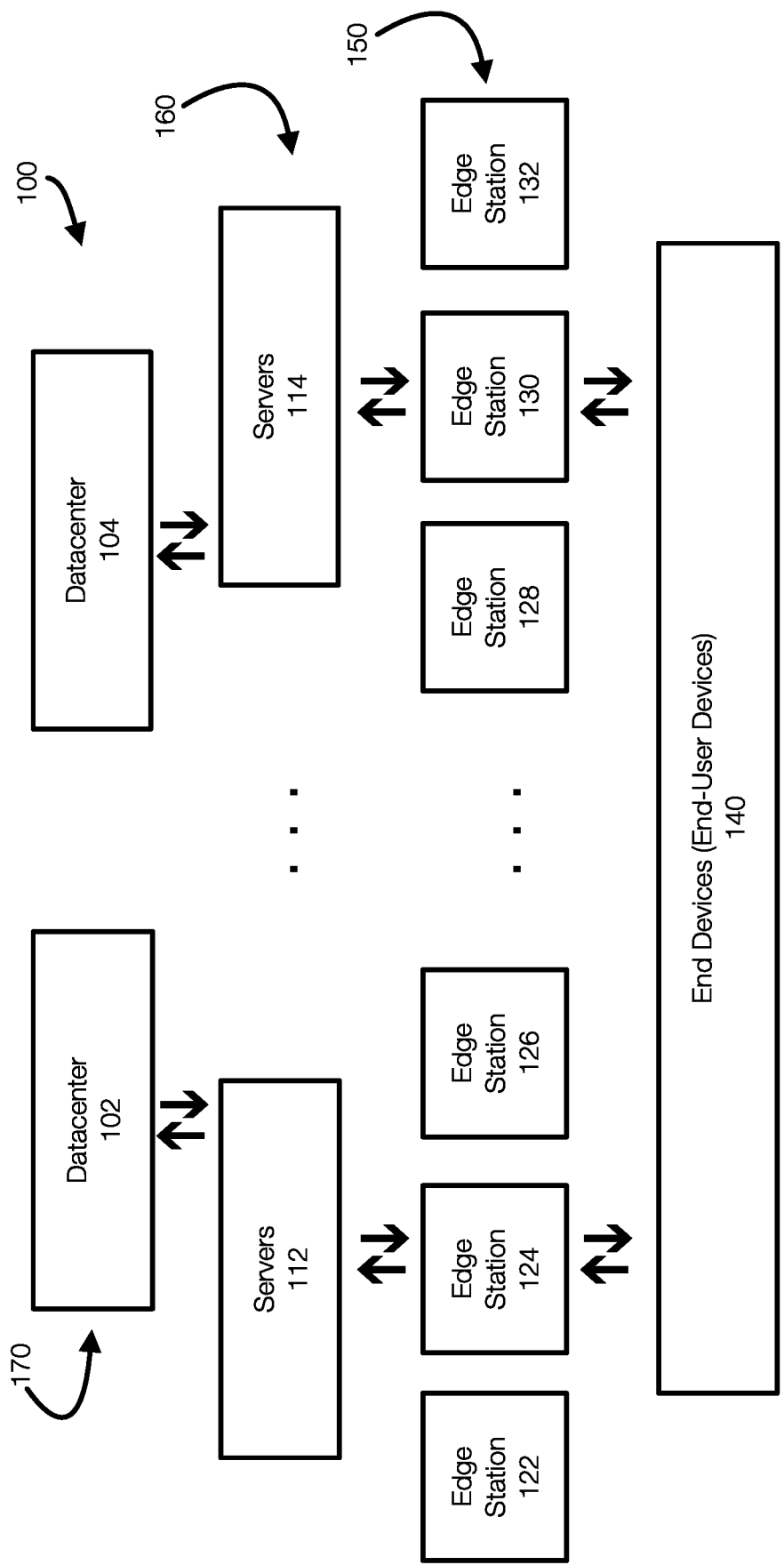
FIG. 1 illustrates an example of an edge computing system that includes edge stations instantiated or running on private infrastructure.

Embodiments of the present invention generally relate to edge networks and edge computing. More particularly, at least some embodiments of the invention relate to systems, hardware, software, computer-readable media, and methods for forming a union of cloud-native clusters or edge stations that include or use privately-owned infrastructure.

Edge stations can be viewed as datacenters on a smaller scale. In edge networks, edge stations are typically the devices or systems that interact with end-user devices or end devices. Edge stations can be configured to provide functionality in addition to allowing access to content. The functionality provided by edge stations may include, but is not limited to, live data, heterogeneous compute, local and cloud data storage services, or the like. Edge stations can be configured to provide the functionality of functions and services in the cloud while being closer to the end user or end devices.

Edge stations advantageously provide this functionality with reduced network latency because end devices (or users) are located closer to the edge stations and can connect to the edge stations. The edge stations provide the functionality that may have been provided at the datacenter, but at a location closer to the end user. This avoids the requirement of transmitting network packets over longer distances and improves response times and performance. The functionality of compute resources, storage resources, and network benefits enables new and improved user experiences. An edge station can be configured to operate cloud-native applications (an application configured to operate in a cloud environment such as a datacenter).

The size of edge stations can vary and may be related to power availability. For example, larger edge stations can support an entire municipality while smaller edge stations can be installed inside with local networks or in various locations such as homes, stores, schools, libraries, or the like.

Embodiments of the invention provide software and/or hardware that allow a union of cloud-native clusters (scalable to a single machine or to many machines or many diverse infrastructures) to be formed that are made up of or at least partially include privately owned infrastructure. Each cluster or edge station may simultaneously power private use cases. In some examples, the private use cases may have priority over cloud-native applications. Embodiments of the invention provide a mechanism for infrastructure owners to provide access to cloud service providers in exchange for compensation such as rewards, cash credit, discounts, or the like.

Edge stations may increase the computing power available to end devices because the processing can be performed at a location close to the end device.

As described herein, software providers develop and deploy software that can be used by end-users. Software providers are also the consumer of edge services provided by cloud service providers. Using embodiments of the invention, this allows software providers to run software on the infrastructure as configured and disclosed herein.

Cloud service providers provide infrastructure as a service from their datacenters. Embodiments of the invention allow cloud service providers to provide edge infrastructure as a service to their customers. Software providers are examples of customers of cloud service providers. For example, private infrastructure owners have hardware in their private domain for their own use cases. Examples include homeowners, schools, IT departments in various industries, or the like. Embodiments of the invention allow the private infrastructure to be configured as edge stations that provide cloud functionality.

A union includes one or more private infrastructure owners and provides edge capabilities or edge computing resources for cloud service providers to execute their workload(s). A union may be a company, a telecommunication company, a cloud service provider, or the like. A cloud service provider could also be a union. In addition, cloud service providers and unions may form a many-to-many relationship. Cloud service providers can use multiple unions to obtain edge computing capabilities and unions can sell their edge capabilities to multiple cloud service providers.

FIG. 1 illustrates an example an edge network 100. FIG. 1 illustrates edge stations 150, represented by edge stations 122, 124, 126, 128, 130 and 132. Some of these edge stations may be owned by a cloud provider while others may be created using private infrastructure of a private infrastructure owner. The edge stations 150 may interact directly with end user devices 140, examples of which include Internet of Things (IoT) devices, smartphones, tablets, and other computing devices.

The edge stations 150 may communicate with servers 160, represented by servers 112 and 114 or directly with datacenters 170, represented by datacenters 102 and 104. The flow of data in the edge network 100 may follow different paths and may depend on the application being executed. A software provider may run an application from the datacenter 102 while another software provider may run a different application on the datacenter 104. The datacenters thus provide compute resources, storage resources, and the like. The servers 160 may facilitate the flow of data, facilitate the distribution of software, provide compute resources, provide storage, or the like. The number of layers in the edge network can vary and the types of networks used can also vary. For example, end devices may connect with edge stations using telecommunication networks while the edge stations may connect using the Internet or the like.

The edge network 100 is typically configured to bring computing resources such as computation and storage closer to the location where the resources are needed. This reduces latencies and conserves bandwidth in the edge network 100. Embodiments of the invention allow cloud service providers to effectively have edge stations at various geographical locations in a temporary or as-needed basis by effectively converting or configuring private infrastructure to operate as an edge station or server and to support cloud-native operations and applications. This allows cloud service providers to use private infrastructure to provide functionality at a location closer to the end device.

Figure 2:
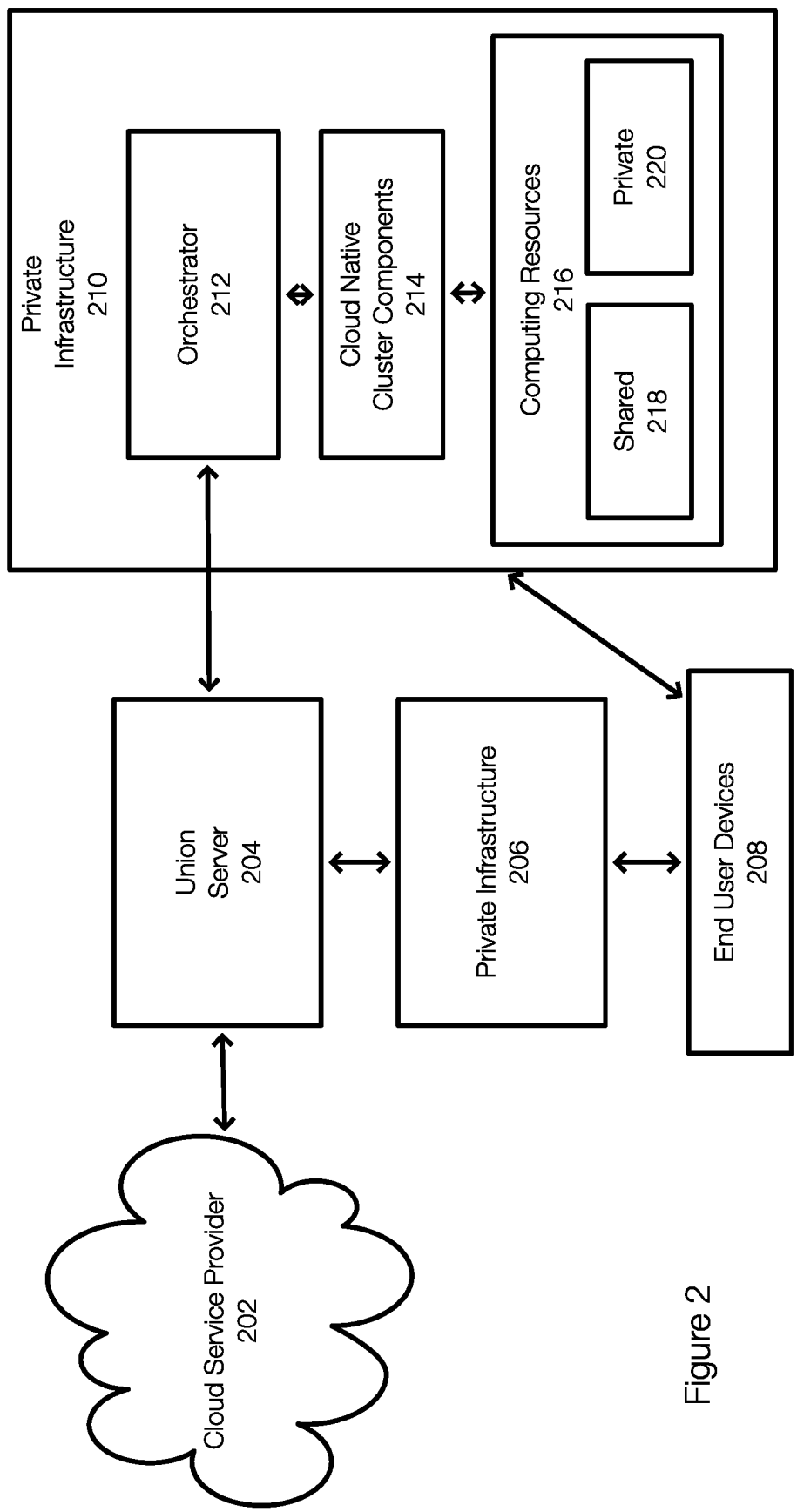
FIG. 2 illustrates a system diagram of edge stations installed an operating on private infrastructure and illustrates that the edge stations are available to cloud service providers.

FIG. 2 illustrates an example embodiment of a union formation of cloud-native cluster (also referred to herein as an edge station). Embodiments of the invention include software and/or hardware (e.g., appliance or other device) configured to form a union that includes privately owned infrastructure. Each private infrastructure would form, by way of example, an independent cluster. The cluster or edge station, for example, may operate as a cluster at least because of the ability to provide multiple nodes (e.g., servers, virtual machines, pods, etc.) The union can consolidate these clusters and provide various functionality including unified service to a cloud service provider, scheduling and orchestration, billing, and inventory.

FIG. 2 illustrates a relationship between a cloud service provider 202 (that typically provides and operates a cloud or datacenter infrastructure) and private infrastructure, represented by private infrastructure 206 and 210. Prior to operation as an edge station or edge cloud-native cluster, the private infrastructure 210 is prepared. In this example, cloud-native cluster components 214 are installed on the computing resources 216 of the private infrastructure 210. The cloud-native cluster components 214 may include, for example, an operating system, CaaS (Containers as a Service), FaaS (Functions as a Service) and/or other components. This allows the private infrastructure 210 to be configured with a cluster or edge station with cloud capabilities. In effect, the edge stations become an edge cloud.

An orchestrator 212 is installed on the cloud-native cluster components 214. The orchestrator 212 may also act as an interface for private use cases. In one example, the computing resources 216 may include shared resources 218 (resources made available to cloud service providers and software providers) and private resources 220. The private resources 220 may be used for private use cases.

The division between the shared resources 218 and the private resources 220 can vary and may be governed by the orchestrator 212. The orchestrator 212 may ensure that the private resources 220 are sufficient for the use cases of the owner of the private infrastructure 210. The division of the computing resources 216 may be variable and can be adapted over time. The orchestrator 212 may ensure that the shared resources 218 and the private resources 220 are kept separated and are not accessible to each other.

The union server 204 (software and/or hardware) may be deployed at a datacenter (in the cloud) or other location and is configured to communicate with the orchestrator 212 and is configured to communicate with multiple orchestrators at multiple installations. The union server 204 may be responsible for consolidating the private infrastructure 210 and 206 (now configured as edge stations or cloud-native clusters that can run cloud-native applications) and offer the capabilities of these edge stations to cloud service providers. Cloud service providers that use these resources or edge stations allow functionality and services to be moved closer to the end-user devices 208, which may interact with these edge stations operating in private infrastructures 206 and 210.

Embodiments of the invention can be used in 3-tier edge models (cloud/edge-station/end-device) or n-tier models where n number of edge-stations can be used to provide optimal performance based on network speed and resource capabilities at each of these edge stations.

The union server 204 may be configured to perform scheduling and workload placement and may be configured to form a topology of edge stations across geographical locations. For example, a cloud service provider may desire to provide services in a certain geographic region. The edge stations installed or formed using private infrastructure can be used (e.g., leased/rented/borrowed) within that region to provide or form a topology of edge stations across that specific geographic region.

Embodiments of the invention may be installed as software and/or appliance at the private infrastructures. However, Internet connectivity is typically needed in order to communicate with the union server 204 and with end user devices. Once the cloud-native cluster components 214 and the orchestrator are installed, the orchestrator 212 may establish communication with the union server 204. Over time, the orchestrator monitors the private infrastructure 210 (e.g., for resource availability, resource type, capabilities, speeds, or the like). Telemetry information regarding these characteristics of the private infrastructure 210 are sent to the union server 204. The telemetry data may include data relevant to the computing requirements of cloud service providers.

Once installation is complete, the private infrastructure is configured as an edge station or a cloud-native cluster. The edge station (or private infrastructure 210) is added to an inventory of the union server 204. The inventory entry for the private infrastructure 210 may specify characteristics, availability, computing resources, processors, processing speed, network speed, bandwidth, or the like.

Figure 3:
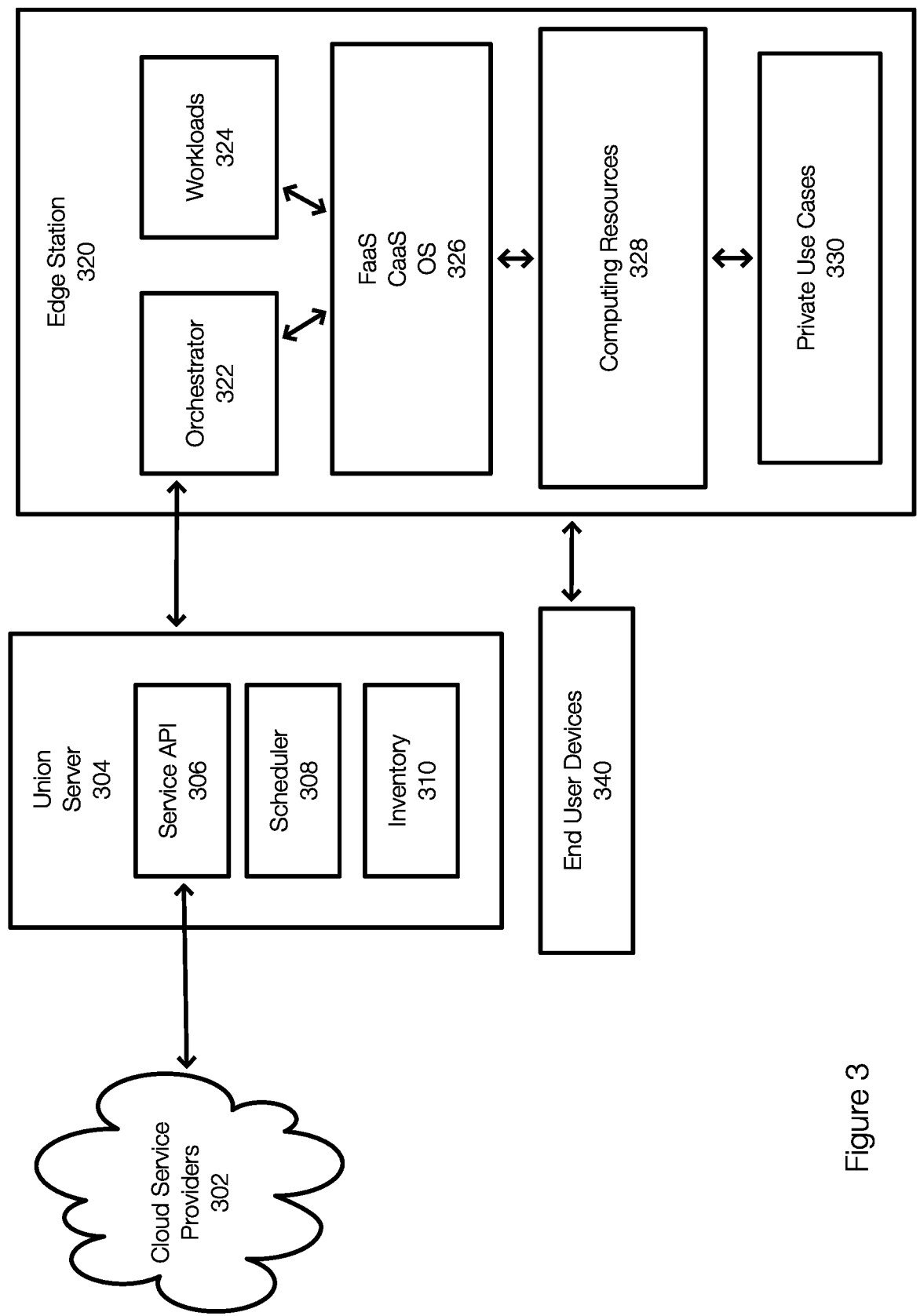
FIG. 3 illustrates a system diagram for operating or using edge stations as cloud-native clusters.

FIG. 3 illustrates an example of a union of edge cloud-native clusters that have been installed and are ready for use by the cloud service providers. FIG. 3 illustrates a union server 304 that includes a service API 306, a scheduler 308, and an inventory 310. FIG. 3 also illustrates an edge station 320, which is an example of private infrastructure that has become part of a union and has been provisioned to operate or execute cloud-native applications and functionality.

When a cloud service provider 302 requires additional edge capability at a specific location, the cloud service provider 302 may invoke the service API 306 of the union server 304. When the cloud service provider 302 accesses the service API 306 of the union server 304, the cloud service provider 302 may provide requirements such as hardware resource, network speed, or other service level objectives or resource requirements.

Based on the requirements received from the cloud service provider 302, the union server 304 may use the scheduler 308 to identify one or more edge stations that satisfy the requirements of the cloud servicer provider 302. Thus, the scheduler 302 is configured to search the inventory 310 and identify which of the edge stations registered with the union server 304 or part of a union that are able to satisfy the requirements of the cloud service provider 302. The inventory 310, as previously indicated, stores these types of characteristics for each edge station. This allows the union server 304 to identify edge stations for various requests.

Once the edge station 320 is identified by the scheduler 308, the union server 304 may notify the orchestrator 322 to start executing a workload(s) 324. This may include transmitting a container image to the edge station 320. The container image may be retrieved from a library or other location. Once the container and data are prepared on the edge station 320, the union server 304 may establish a virtual route for the end user devices 340 to access the workloads 324 running on the edge station 320.

The union server 304 tracks hardware usage of the workload running on the edge station 320. This allows the cloud service provider 302 to be charged and the owner of the private infrastructure to be compensated. In addition, private user cases 330 may have a higher priority than the workloads 324. Further, the end user devices 340 may be mobile and the workloads 324 may be migrated to another edge station 320.

Figure 4:
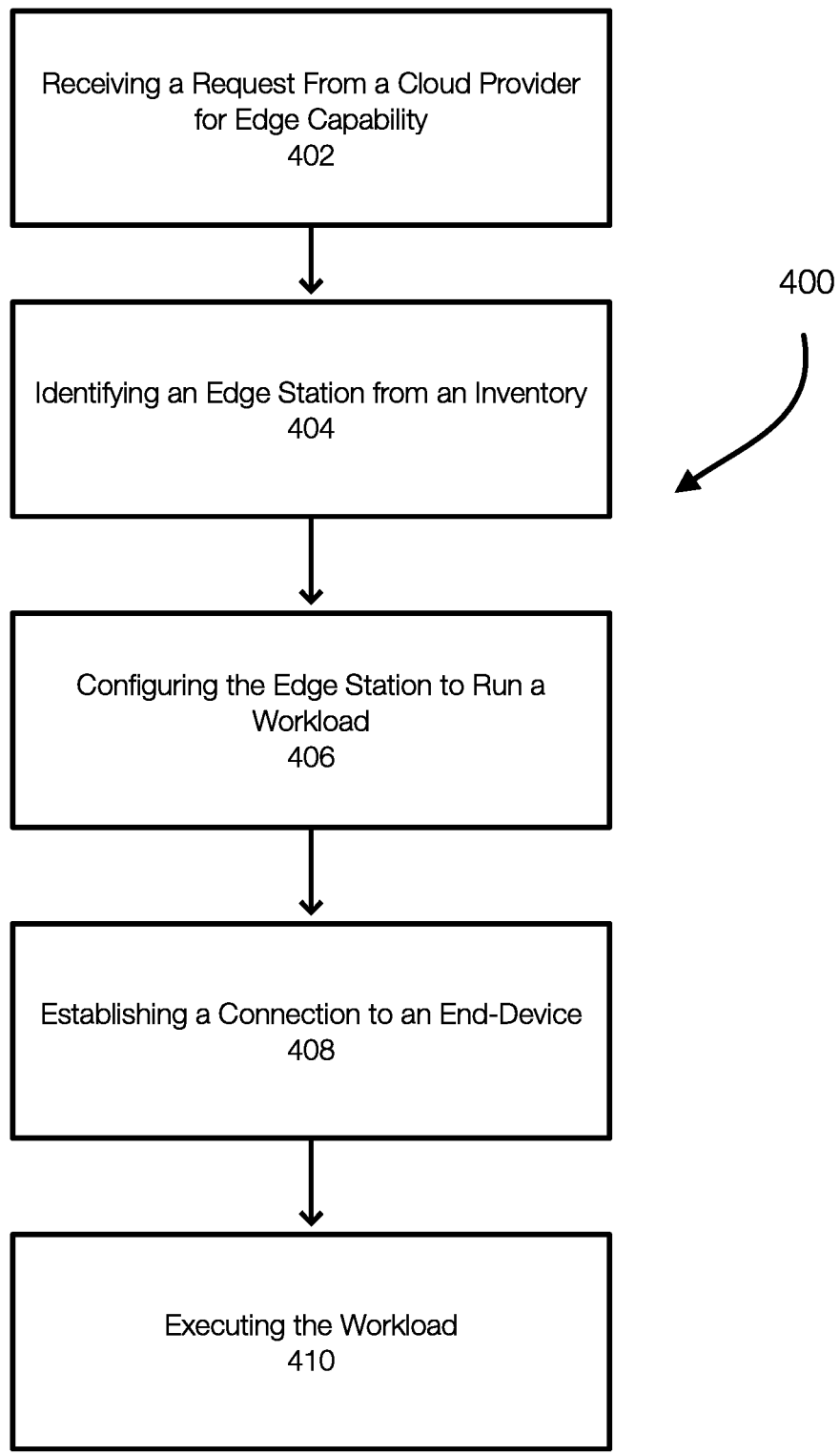
FIG. 4 illustrates an example of operating or using edge stations to perform workloads and interact with end devices.

FIG. 4 illustrates an example of a method for forming edge stations or cloud-native clusters using private infrastructure. FIG. 4 illustrates an example of a method for executing a workload in a cloud environment and in an edge network. Embodiments of the invention establish edge stations, operating on the edge of the network, that are configured to execute workloads as if in a typical datacenter. In addition, the edge stations are geographically closer to the end-device or end-user device.

Before operating and performing cloud functionality at the edge stations, the components of a cloud-native cluster are installed. Further, the private infrastructure (or the installed edge station) may register with a union server. Registration allows the union server to have an inventory of edge stations. During registration or during installation, the capabilities of the private infrastructure may be evaluated (resources, servers, memory, network speed, network components, bandwidth, etc.). This allows the union server to match requests from the cloud service providers to the inventory and select an appropriate install or edge station. If necessary, multiple edge stations or a topology of edge stations may be selected in response to the request.

After installing cloud components in a private infrastructure such as an operating system, CaaS functionality, FaaS functionality, the private infrastructure includes an edge station that is configured to operate cloud-native applications. The method 400 may begin when a request is received 402 at a union server from a cloud provider for edge capability.

After the request is received, the union server may identify 404 an edge station (or a plurality of edge stations) from the inventory. This may be performed by a scheduler, which may be a part of the union server.

The union server is configured, by way of example, to schedule (which includes matching requests from the cloud service providers to available inventory) edge stations for the cloud provider. Initially, the matching may be based on the resources required by the cloud provider. Only edge stations with sufficient resources that match or exceed the requested resources are typically selected.

In addition to matching aspects of the request related to computing resources, scheduling from inventory may also have a geographical aspect. For example, a cloud service provider may want to use an edge station in a specific location (e.g., street, school, neighborhood, city, or other geography). This may result in the selection of a single edge station with substantial capability and sufficient power or in the selection of multiple edge stations that are geographically distributed within the designated geography.

Scheduling an edge station from an inventory may also need to account for existing obligations. For example, edge stations may be scheduled in advance by the same or other cloud service providers. As a result, the scheduler may ensure that the identified edge station is available for the requested time. Thus, identifying an edge station includes one or more of searching an inventory of edge stations based on resource requirements, geography, and availability.

Once a suitable edge station is identified or scheduled, the edge station is configured 406 to run a workload. This may include transmitting a container image and/or data to the identified edge station. A container may then be run from the container image.

Next, the edge station is now prepared to execute or service a workload. A connection (e.g., a virtual connection) may be established 408 with at least one end device. This may be an end-user device such as a smartphone or tablet. The workload is then executed 410. Advantageously, the end-user device gains the benefit of the resources of the edge-station, which are likely to be greater and more powerful than the end-user device. In addition, these resources of the edge station are geographically closer to the end-user device than a datacenter of the cloud provider. This reduces network latency and provides other efficiencies.

During operation of the workload, there may be instances when the workload competes with private use cases. In some examples, the private use cases are given priority over workloads of the cloud providers at least because the workloads are operating in a private infrastructure. The priorities can be based on various factors such as importance, user input, policies established between the owner and the union server prior to installation of the union formation software/hardware.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with system, software, and components, that individually and/or collectively implement, and/or cause the implementation of, edge computing operations, cloud-native operations, geographic specific cloud-based operations, or the like. More generally, the scope of the invention embraces any operating environment in which the disclosed concepts may be useful.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, Microsoft Azure, Amazon AWS, and Google Cloud. More generally however, the scope of the invention is not limited to employment of any particular type or implementation of cloud storage.

In addition to the storage environment, the operating environment may also include one or more clients that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

Following are some further example embodiments of the invention. These are presented only by way of example and are not intended to limit the scope of the invention in any way.

Embodiment 1. A method, comprising receiving a request from a cloud provider for edge capability that is closer to an end-device than a datacenter at a union server, the edge capability including computing resources, identifying an edge station from an inventory of edge stations by the union cloud, wherein the edge station is installed in a private infrastructure, configuring the identified edge station to run a workload of the cloud provider, establishing a connection to an end-device and the workload on the identified edge station, and executing the workload.

Embodiment 2. The method of embodiment 1, wherein the request includes requirements of the edge capability including hardware resources or network speed and the union server ensures that the identified edge station satisfies the requirements.

Embodiment 3. The method of embodiment 1 and/or 2, further comprising configuring the private infrastructure with cloud-native cluster components including CaaS and FaaS and an operating system.

Embodiment 4. The method of embodiment 1, 2 and/or 3, further comprising configuring the identified edge station by transmitting a container image to the identified edge station and running a container from the container image on the identified edge station.

Embodiment 5. The method of embodiment 1, 2, 3 and/or 4, further comprising scheduling the identified edge station based on one or more of computing resources, geography, and/or availability.

Embodiment 6. The method of embodiment 1, 2, 3, 4, and/or 5, further comprising identifying a plurality of edge stations and configuring each of the plurality of edge stations to run workloads of the cloud provider.

Embodiment 7. The method of embodiment 1, 2, 3, 4, 5, and/or 6, further comprising tracking use of resources of the edge station, wherein the union cloud is configured to ensure an owner of the private infrastructure is compensated by the cloud provider for the use of the computing resources used by the edge station operating in the private infrastructure.

Embodiment 8. The method of embodiment 1, 2, 3, 4, 5, 6, and/or 7, further comprising configuring the edge station such that private use cases at the private infrastructure are prioritized over the workload of the cloud provider.

Embodiment 9. The method of embodiment 1, 2, 3, 4, 5, 6, 7, and/or 8, further comprising forming a topology of edge stations based on the inventory maintained by the union server.

Embodiment 10. The method of embodiment 1, 2, 3, 4, 5, 6, 7, 8, and/or 9, further comprising configuring the private infrastructure with an orchestrator, wherein the orchestrator is configured to service requests from the union server and from private use cases.

Embodiment 11. A method for performing any of the operations, methods, or processes, or any portion of any of these, disclosed herein.

Embodiment 12. A non-transitory storage medium having stored therein instructions that are executable by one or more hardware processors to perform the operations of any one or more of or portions of embodiments 1 through 11.

Embodiment 13. A server configured to implement any one or more of or portions of embodiments 1-12, the server including an API, a scheduler, and an orchestrator.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

Embodiments of the invention thus provide a union cloud such that privately owned cloud-native edge stations or clusters can be combined to form an edge cloud. Embodiments of the invention can scale at least because more populated areas are likely to have more privately owned infrastructure. When population drives the demand for edge computing, embodiments of the invention enable a solution to address these demands in a dynamic manner. Edge stations can be added/removed as needed according to demand.

By way of example only, embodiments of the invention could be implemented by an Internet Service Provider (ISP) as an expandable multi-purpose solution, providing capabilities of internet modem, router, mesh network, compute and storage. For each homeowner, the ISP can provide one or more appliances (depending on the size of the home and workload demand).

Homeowners can set up private use cases (such as smart home devices, security systems, etc.) to execute workloads on these appliances. When these appliances are under-utilized, the ISP can orchestrate additional edge workloads on these appliances.

According to the usage and resource consumption, the homeowner can receive cash credit or discount from the ISP for each payment cycle.

Through the service API, each cloud service provider can set up edge services that utilize the edge capabilities offered by the ISP. Software providers can then set up their edge workload based on the service offered by the cloud service providers.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Any one or more of the entities disclosed, or implied, by the Figures and/or elsewhere herein, may take the form of, or include, or be implemented on, or hosted by, a physical computing device. As well, where any of the aforementioned elements comprise or consist of a virtual machine (VM), that VM may constitute a virtualization of any combination of the physical components disclosed herein.

In one example, the physical computing device includes a memory which may include one, some, or all, of random access memory (RAM), non-volatile random access memory (NVRAM), read-only memory (ROM), and persistent memory, one or more hardware processors, non-transitory storage media, UI device, and data storage. One or more of the memory components of the physical computing device may take the form of solid state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
receiving a request from a cloud provider for edge capability that is closer to an end-device than a datacenter at a union server, the edge capability including computing resources;
identifying an edge station from an inventory of edge stations by the union server, wherein the edge station is installed in a private infrastructure that includes private resources and shared resources, wherein the edge station is installed in the shared resources, wherein the private resources are not accessible for satisfying the request, wherein the private resources are used for private use cases of an owner of the private infrastructure;
configuring the identified edge station to run a workload of the cloud provider;
establishing a connection to an end-device and the workload on the identified edge station; and
executing the workload.

2. The method of claim 1, wherein the request includes requirements of the edge capability including hardware resources or network speed and the union server ensures that the identified edge station satisfies the requirements.

3. The method of claim 1, further comprising configuring the private infrastructure with cloud-native cluster components including CaaS (Containers as a Services) and FaaS (Function as a Service) and an operating system.

4. The method of claim 1, further comprising configuring the identified edge station by transmitting a container image to the identified edge station and running a container from the container image on the identified edge station.

5. The method of claim 4, further comprising scheduling the identified edge station based on one or more of computing resources, geography, and/or availability.

6. The method of claim 1, further comprising identifying a plurality of edge stations and configuring each of the plurality of edge stations to run workloads of the cloud provider.

7. The method of claim 1, further comprising tracking use of resources of the edge station, wherein the union server is configured to ensure an owner of the private infrastructure is compensated by the cloud provider for the use of the computing resources used by the edge station operating in the private infrastructure.

8. The method of claim 1, further comprising configuring the edge station such that the private use cases at the private infrastructure are prioritized over the workload of the cloud provider.

9. The method of claim 1, further comprising forming a topology of edge stations based on the inventory maintained by the union server.

10. The method of claim 1, further comprising configuring the private infrastructure with an orchestrator, wherein the orchestrator is configured to service requests from the union server and from private use cases.

11. A non-transitory storage medium having stored therein instructions that are executable by one or more hardware processors to perform operations comprising:

receiving a request from a cloud provider for edge capability that is closer to an end-device than a datacenter at a union server, the edge capability including computing resources;

identifying an edge station from an inventory of edge stations by the union server, wherein the edge station is installed in a private infrastructure that includes private resources and shared resources, wherein the edge station is installed in the shared resources, wherein the private resources are not accessible for satisfying the request, wherein the private resources are used for private use cases of an owner of the private infrastructure;

configuring the identified edge station to run a workload of the cloud provider;

establishing a connection to an end-device and the workload on the identified edge station; and executing the workload.

12. The non-transitory storage medium of claim 11, wherein the request includes requirements of the edge capability including hardware resources or network speed and the union server ensures that the identified edge station satisfies the requirements.

13. The non-transitory storage medium of claim 11, operations further comprising configuring the private infrastructure with cloud-native cluster components including CaaS (Containers as a Service) and FaaS (Functions as a Service) and an operating system.

14. The non-transitory storage medium of claim 11, the operations further comprising configuring the identified edge station by transmitting a container image to the identified edge station and running a container from the container image on the identified edge station.

15. The non-transitory storage medium of claim 14, the operations further comprising migrating the container to another edge station.

16. The non-transitory storage medium of claim 11, the operations further comprising identifying a plurality of edge stations and configuring each of the plurality of edge stations to run workloads of the cloud provider.

17. The non-transitory storage medium of claim 11, the operations further comprising tracking use of resources of the edge station, wherein the union server is configured to ensure an owner of the private infrastructure is compensated by the cloud provider for the use of the computing resources used by the edge station operating in the private infrastructure.

18. The non-transitory storage medium of claim 11, the operations further comprising configuring the edge station such that the private use cases at the private infrastructure are prioritized over the workload of the cloud provider.

19. The non-transitory storage medium of claim 11, the operations further comprising forming a topology of edge stations based on the inventory maintained by the union server.

20. The non-transitory storage medium of claim 11, the operations further comprising configuring the private infrastructure with an orchestrator, wherein the orchestrator is configured to service requests from the union server and from private use cases.

* * * * *